(12) United States Patent
Horman et al.

(10) Patent No.: US 9,503,392 B2
(45) Date of Patent: Nov. 22, 2016

(54) ENHANCE PRIVATE CLOUD SYSTEM PROVISIONING SECURITY

(71) Applicant: Red Hat, Inc., Raleigh, NC (US)

(72) Inventors: Neil R. T. Horman, Cary, NC (US);
James A. Laska, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 252 days.

(21) Appl. No.: 13/767,742

(22) Filed: Feb. 14, 2013

(65) Prior Publication Data

US 2014/0229620 A1  Aug. 14, 2014

(51) Int. Cl.
*H04L 12/24* (2006.01)
*H04L 12/911* (2013.01)
*H04L 29/06* (2006.01)

(52) U.S. Cl.
CPC ......... *H04L 47/783* (2013.01); *H04L 41/0806* (2013.01); *H04L 41/12* (2013.01); *H04L 63/1466* (2013.01)

(58) Field of Classification Search
CPC ............... H04L 47/783; H04L 63/1466; H04L 41/12; H04L 41/0806

USPC ................................ 709/203, 223, 229, 242
See application file for complete search history.

(56) References Cited

U.S. PATENT DOCUMENTS

| | | | |
|---|---|---|---|
| 8,386,593 B1* | 2/2013 | Gao et al. ..................... | 709/223 |
| 2010/0217864 A1* | 8/2010 | Ferris ............................. | 709/226 |
| 2011/0142053 A1* | 6/2011 | Van Der Merwe et al. .......................... | 370/395.1 |
| 2013/0046892 A1* | 2/2013 | Otani ............................. | 709/226 |
| 2013/0173772 A1* | 7/2013 | Nitu et al. .................... | 709/223 |

\* cited by examiner

*Primary Examiner* — Kim T Nguyen
(74) *Attorney, Agent, or Firm* — Lowenstein Sandler LLP

(57) ABSTRACT

A method and system for securely provisioning a host, the method including determining, by a provisioning system, a physical path from the host in a cloud to the provisioning system, wherein the physical path includes static mapping for a device between the host and the provisioning system. The provisioning system receives a request to provision a virtual machine on a guest host in a cloud, and sends installation information for the virtual machine via the determined physical path.

20 Claims, 5 Drawing Sheets

ENHANCE PRIVATE CLOUD SYSTEM PROVISIONING SECURITY

TECHNICAL FIELD

Embodiments of the present disclosure relate to cloud computing and, more particularly, to a technique of cloud system provisioning security.

BACKGROUND

Cloud computing is generally becoming the platform of choice for businesses that want to reduce operating expenses and be able to scale resources rapidly. Eased automation, flexibility, mobility, resiliency, and redundancy are several of the advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud environment the next day. However, provisioning virtual machines remotely has traditionally been a difficult task from a security standpoint.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Embodiments of the disclosure are directed to a method and system for securely provisioning a host machine ("host") in a cloud. A provisioning system determines a physical path from the provisioning system to the host in the cloud, wherein the physical path includes static mapping for one or more devices, e.g., switches, between the host and the provisioning system. The physical path can be determined by determining a device between the provisioning system and the host, and adding the static mapping to a table for the device. The static mapping of the device can be added via a Single Network Management Protocol (SNMP) request. In one embodiment, the static mapping designates a port of the device.

The provisioning system receives a request to provision a virtual machine on the host, and sends installation information for the virtual machine via the determined physical path. The provisioning system receives confirmation of completion of provisioning of the virtual machine, which can include receiving confirmation via an Internet Protocol (IP) address from the host.

Prior to a virtual machine being provisioned, the host has no information upon which to provide authentication back to the provisioning system after virtual machine image installation is complete. Therefore, an attacker can subvert the environment by posing as the provisioned system or host. Further, information contained in the installed image is accessible to any system. As a result, encryption does not provide security in this situation without additional hardware local to the host and the provisioning system to hold a shared secret or asymmetric encryption key. Security is particularly difficult when provisioning virtual machines on a host in a cloud environment, as hardware involved is abstracted away from the administrator (e.g., there are multiple hops between a provisioning system and a host). Implementations of the present disclosure facilitate enhanced security in a cloud environment by providing a secure path that allows a distributed infrastructure management solution to provision a virtual machine in a cloud and receive confirmation of successful provisioning.

Figure 1:
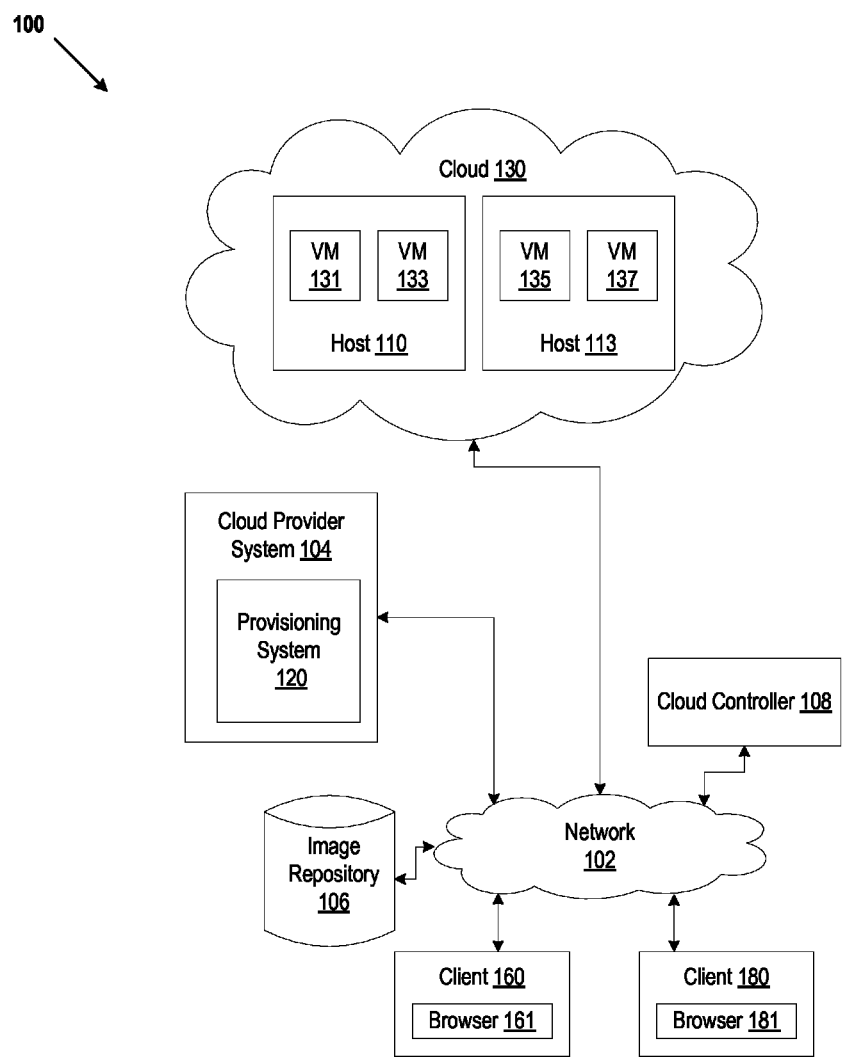
FIG. 1 illustrates exemplary system architecture, in accordance with various embodiments of the present disclosure.

FIG. 1 is a block diagram of a network architecture 100 for a distributed computing system, in which embodiments of the invention may operate. The network architecture 100 can include one or more clouds (networks of computing resources) 130 managed by one or more cloud provider systems 104. There can be any number of clouds 130 and cloud provider systems 104. For brevity and simplicity, one cloud 130 is used as an example throughout this document. In an embodiment, the network architecture includes clouds from multiple cloud providers, and multiple clouds can be provided by a cloud provider. The cloud 130 provides virtual machines. There can be any number of virtual machines in a cloud 130. For brevity and simplicity, four virtual machines are used as an example in architecture 100. For example, cloud 130 provides virtual machines 131, 133, 135, and 137. Each virtual machine (VM) is hosted on a physical machine configured as part of the cloud 130. Such physical machines are often located in a data center. For example, virtual machines 131 and 133 are hosted on host 110 in cloud 130 provided by cloud provider system 104, and virtual machines 135 and 137 are hosted on host 113 in cloud 130 provided by cloud provider system 104.

The cloud provider system 104 and cloud 130 may be provided as an infrastructure as a service (IaaS) layer. The cloud provider system 104 and cloud 130 may be provided by, for example, a third party cloud provider or an organization including consumers of cloud 130. For example, cloud provider system 104 and cloud 130 may be provided by Cloud-Provider-1. A cloud provider can provide more than one type of cloud provider system 104 and more than one type of cloud 130. The cloud provider can be an entity. An entity, as referred to here, can represent any person, a business organization such as a corporation, an educational institution such as a college or university, etc. Users can interact with applications executing on cloud-based virtual machines using client computer systems, such as clients 160, 180, via corresponding web browser programs 161, 181. Users may have one or more accounts associated with a cloud provider system 104.

Clients 160, 180 are connected to hosts 110, 113 and cloud provider system 104 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 113 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on the same machine or different machines (e.g., server computers, desktop computers, etc.). The cloud controller 108 may be maintained by a cloud consumer of cloud 130 such as an enterprise (e.g., business, company). In another embodiment, the cloud controller 108 may be maintained by a third party cloud provider. In yet another embodiment, the cloud controller 108 may be part of the cloud provider system 104.

The cloud controller 108 may manage the execution of applications in the cloud 130. The cloud controller 108 may receive input, for example, from a system administrator via a client 160, 180, describing VMs 131, 133, 135, 137 to be deployed in the cloud 130 for execution of the applications. A VM may execute one or more applications. Alternatively, several VMs may be used to execute a single application (a composite application), with each virtual machine executing one or more components of a composite application. An image repository 106 can be populated with application deployment data to be used to deploy the VMs 131, 133, 135, 137. In one embodiment, the cloud controller 108 generates the application deployment data based on the user input and stores the application deployment data in the image repository 106. The repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The application deployment data can be described in a structured format that specifies the bootable operating system, along with any software requirements, such as additional software packages to be installed, beyond the base operating system, additional configuration which may be required, for example, network ports on which services should be made available, and specific targeting information to instantiate a virtual machine, for example, a hardware profile, which specifies an amount of RAM, and a number of virtual CPUs. The application deployment data can be a hierarchy of data that includes deployables, assemblies, and templates. Each deployable describes an overview of one or more virtual machines to be deployed as a group. A deployable can describe any number of arbitrarily large and complex deployments of virtual machines or a small number of virtual machines. A deployable can be described by an XML file.

An assembly is a description of a virtual machine to be deployed. An assembly can be described by an XML file. An assembly can include the description of a service to be provided by a virtual machine, the description of a service to be used by a virtual machine, and the description of one or more parameter values to be provided to or relied upon by a virtual machine. The following is an example of a deployable definition, including assemblies:

```
<?xml version="1.0"?>
<deployable version="1.0" name="test">
<description/>
<assemblies>
<assembly hwp="small-x86_64" name="test1">
```

-continued

```
<image id="aeaeb15e-1eb3-11e2-b10e-52540028e9a5"/>
</assembly>
<assembly hwp="small-x86_64" name="test2">
<image id="aeaeb15e-1eb3-11e2-b10e-52540028e9a5"/>
</assembly>
<assembly hwp="small-x86_64" name="test3">
<image id="aeaeb15e-1eb3-11e2-b10e-52540028e9a5"/>
</assembly>
</assemblies>
</deployable>
```

A template is a description of a disk image and meta-data for creating a virtual machine image. A virtual machine image can be created based on a template. A virtual machine image can be launched to instantiate (create) a virtual machine in a cloud. A template can be described by an XML file. The following is an example of an image template:

```
<template>
<name>f15jeos</name>
<os>
<name>Fedora</name>
<version>15</version>
<arch>x86_64</arch>
<install type='url'>
<url>http://download.devel.redhat.com/released/F-15/GOLD/Fedora/x86_64/osk/url>
</install>
<rootpw>test</rootpw>
</os>
<description>Fedora 15</description>
</template>
```

Returning to FIG. 1, upon receiving a command identifying a specific deployable to launch, the cloud provider system 104 retrieves a reference to the existing image for each virtual machine available to be run/cloned on top of a hypervisor (not shown). If the virtual machine image is not in the image repository 106, other elements may be used to place the virtual machine image in the repository 106. For example, virtual machine images can be saved in an image repository by an image factory component, which builds and uploads virtual machine images for particular cloud providers. The command may be received from the cloud controller 108 or a user (e.g., a system administrator) via a console computer or a client machine.

A provisioning system 120, which can be part of the cloud provider system 104 (as shown) or part of the cloud controller 108, determines a physical path from the provisioning system 120 to a host 110, 113 in a cloud 130, wherein the physical path is described by static addresses for one or more devices, e.g., switches, between the host 110, 113 and the provisioning system 120. The provisioning system 120 receives a request to provision one or more VMs 131, 133, 135, 137 on a host 110, 113 in a cloud 130, and sends installation information for the VM 131, 133, 135, 137 via the determined physical path (e.g., without using any other path). Images of the VMs 131, 133, 135, 137 can be then launched in the cloud 130 to instantiate the VMs 131, 133, 135, 137 for the deployable. Launch of a VM can include powering on or booting a virtual machine.

Figure 2:
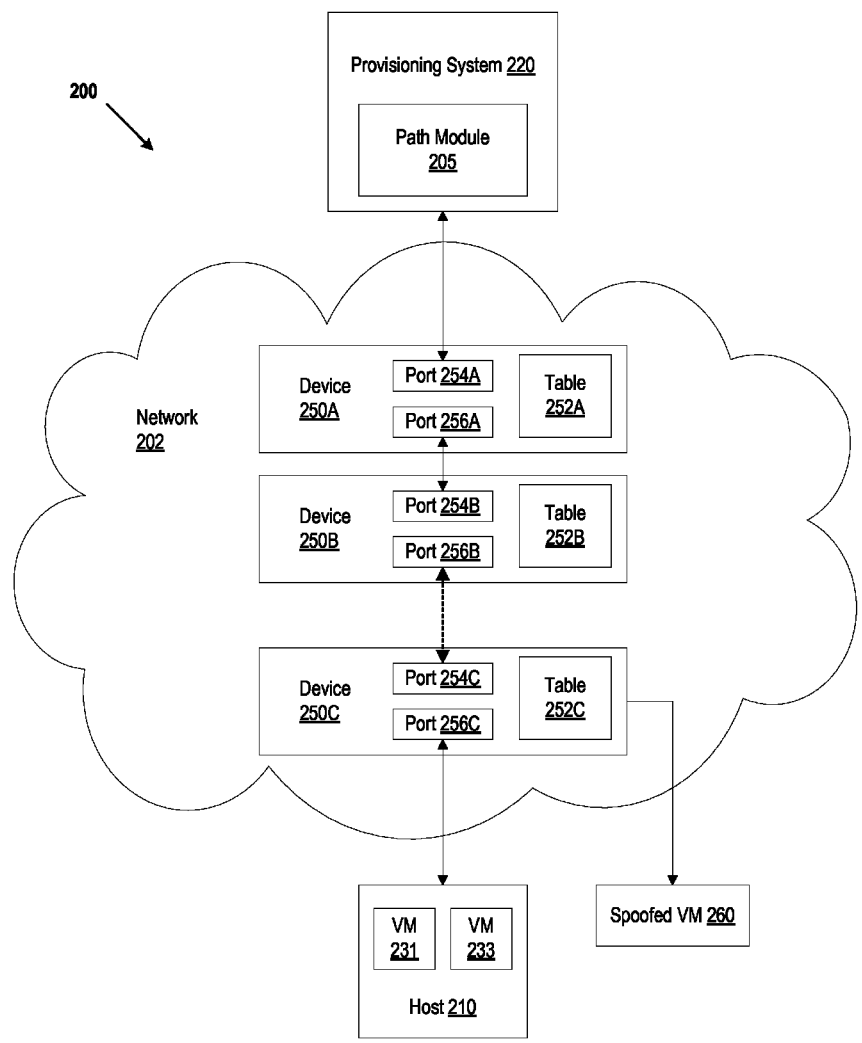
FIG. 2 is a block diagram of a physical path between a provisioning system and a host, in accordance with an embodiment.

FIG. 2 illustrates a physical path 200 for carrying a signal through a network 202 (e.g., an L2 network) between a provisioning system 220 and a host 210. In one embodiment, the network 202 can be the same as the network 102 of FIG. 1, and the provisioning system 220 can be the same as the provisioning system 120 of FIG. 1. The provisioning system 220 includes a path module 205. Note that in alternative embodiments, the provisioning system 220 may include more or less modules than those shown in FIG. 2. Additionally, the functionality of the path module 205 may be divided between multiple modules. Further, in one embodiment, the host 210 can be same as the hosts 110, 113 of FIG. 1, and VMs 231, 233 on the host 210, can be the same as the VMs 131, 133, 135, 137 of FIG. 1.

In one embodiment, the path module 205 of the provisioning system 220 determines a physical path 200 (e.g., a known or fixed network path) in the network 202 between the provisioning system 220 and the host 210, where the VMs 231, 233 are to be hosted. For example, the physical path can include identifiers (e.g., addresses) of one or more devices 250A, 250B, 250C (e.g., data link layer 2 (L2) devices such as switches) between the host 210 and the provisioning system 220. Though only three devices are shown in FIG. 2 for simplicity of illustration, the physical path 200 can include additional devices that are not shown. Each device 250A, 250B, 250C, can include ports (e.g., ports 254A and 256A on device 250A, ports 254B and 256B on device 250B, and ports 254C and 256C on device 250C). Though only two ports are shown on each device for simplicity of illustration, the devices 250A, 250B, 250C can include additional ports that are not shown. The ports 254A, 256A, 254B, 256B, 254C, 256C provide for ingress and egress of a signal between the provisioning system 220 and the host 210.

The provisioning system 220 has control over the selection of the physical path 200 in the network 102 (i.e., data link/physical addressing) in which it provisions systems. As will be discussed in greater detail below, the provisioning system can select the physical path 200 that will be used to communicate with the host 210 to provision the requested VMs 231, 233. For example, using Simple Network Management Protocol (SMNP), which is an Internet standard protocol for managing devices on an IP network, static entries (e.g., Address Resolution Protocol (ARP) entries mapping IP (network) addresses to physical interface (MAC) addresses) can be made in look up tables 252A, 252B, and 252C (e.g., ARP tables containing ARP entries) for the devices 250A, 250B, and 250C, respectively, located between the provisioning system 220 and the host 210 so that communication from a predetermined address for the host 210 (e.g., a Media Access Control (MAC) address) to the provisioning system is via designated ports (e.g., ports 254A, 256A, 254B, 256B, 254C, 256C). Though SNMP is commonly used over TCP/IP, SNMP can be used over other network transports, as well.

In the example shown in FIG. 2, the signal from the host 210 enters device 250C at port 256C and exits device 250C at port 254C. Then, the signal from device 250C enters device 250B at port 256B and exits device 250B at port 254B. Next, the signal from device 250B enters device 250A at port 256A and exits device 250A at port 254A. Finally, the signal arrives at the provisioning system 220. Further, a signal can travel from the provisioning system 220 to the host 210 by traveling through the devices 250A, 250B, and 250C in a reverse order to that described above. In other words, the signal can travel from the provisioning system 200 to port 254A on device 250A, to port 256A on device 250A, to port 254B on device 250B, to port 256B on device 250B, to port 254C on device 250C, to port 256C on device 250C, and to host 210. Here, static ARP entries are made in tables 252A, 252B, and 252C (e.g., ARP tables) for each of the devices 250A, 250B, and 250C by the provisioning system 220 such that communication between the host 210 and the provisioning system 220 occurs exclusively through the designated ports, as described above, though there may be other ports available through which communication between the host 210 and the provisioning system 220 could have been conducted.

The provisioning system 220 can then, via a secure channel, configure a Dynamic Host Configuration Protocol (DHCP) server, which maintains a database of available IP addresses and configuration information, (not shown) to provide a predetermined IP address (i.e., a data link layer 3 (L3) address) when requested by the host 210 during provisioning. Upon completion of provisioning, the host 210 can request an IP address via DHCP using the MAC address of the host 210, and then use that IP address to confirm successful provisioning back to the provisioning system 220. As a result of this confirmation, the provisioning system 220 has confirmation that it is communicating with the host that the provisioning system 220 intended to install over an L3 network.

In one embodiment, potential man-in-the-middle attacks can be avoided since MAC address overrides are prevented due to the fixed physical path that only allows traffic from certain ports, which prevents ARP table poisoning. ARP table poisoning is the process by which an attacker confuses an L2 network such that a legitimate host is actually elsewhere on the network, while the location being controlled by the attacker who controls an illegitimate host pretends to be the legitimate host. For example, if host A (with MAC address X) exists on port 1 of a switch, the attacker may flood certain traffic patterns to port 2 of that switch (specifically traffic containing MAC address X), such that traffic bound for host A would then be directed to port 2, rather than port 1, where host A actually resides. Further, spoofing (e.g., associating a MAC address of a spoofed VM attacker 260 with the IP address of the host 210, so that traffic meant for the host 210 is sent to the MAC address of the attacker instead) can also avoided since the VMs 231, 233 on the host 210 contact the DHCP server to obtain an IP address before communicating a successful install and use of the predetermined IP address prior to that event is seen by the provisioning system 220 as misuse of the IP address.

Figure 3:
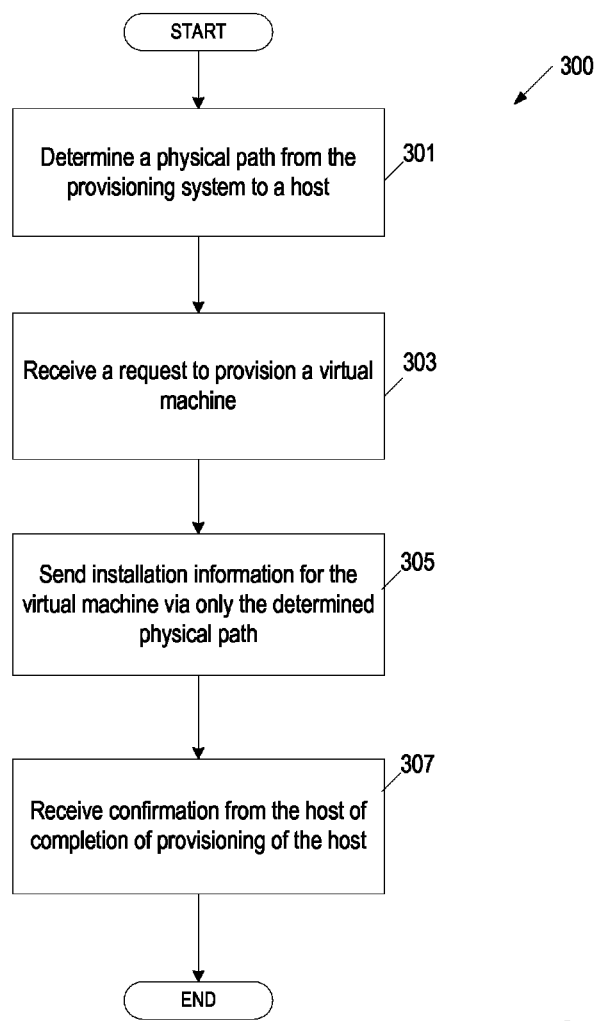
FIG. 3 is a flow diagram illustrating an embodiment of a method of provisioning a host.

FIG. 3 is a flow diagram of an embodiment of a method 300 for provisioning a host. The method 300 is performed by processing logic that may comprise hardware (circuitry, dedicated logic, etc.), software (such as is run on a general purpose computer system or a dedicated machine), or a combination of both. In one embodiment, the method 300 is performed by the provisioning system 220 of FIG. 2.

At block 301, the provisioning system 220 determines a physical path from the provisioning system 220 to the host 210. Here, the provisioning system 220 determines the devices 250A, 250B, and 250C in the network 202 between the provisioning system 220 and the host 210. The provisioning system 220 determines through which ports (e.g., 254A, 256A, 254B, 256B, 254C, 256C) the signal will be carried for communication between the provisioning system 220 and the host 210. In other words, the physical path is defined by static addresses stored in the devices 250A, 250B, and 250C between the provisioning system 220 and the host 210.

At block 303, the provisioning system 220 receives a request to provision a VM. Here, the provisioning system 220 can receive a request to provision one or more VMs from the cloud provider system (e.g., cloud provider system 104 shown in FIG. 1).

At block 305, the provisioning system 220 sends installation information for the VM via the determined physical path. For the example shown in FIG. 2, the provisioning system 220 sends installation information only via the physical path including port 254A, port 256A, port 254B, port 256B, port 254C, and port 256C.

At block 307, the provisioning system 220 receives confirmation from the host 210 of completion of provisioning of the host 210. For example, the provisioning system 220 configures the Dynamic Host Configuration Protocol (DHCP) server to provide the predetermined IP address in response to a request by the MAC address of the host 210 during provisioning. The host 210 requests the IP address via DHCP using the host's MAC address so that the host can use the IP address to confirm successful provisioning back to the provisioning system 220. In other words, only a single path through a particular L2 network will reach the host 210. By pre-assigning an IP address to the provisioned host via DHCP, the IP address from which a report regarding provisioning success is known. Since data from the provisioned host will only be accepted via the single path through the L2 network, communication from the provisioned host is known to be authentic if it arrives via the pre-configured IP address.

Figure 4:
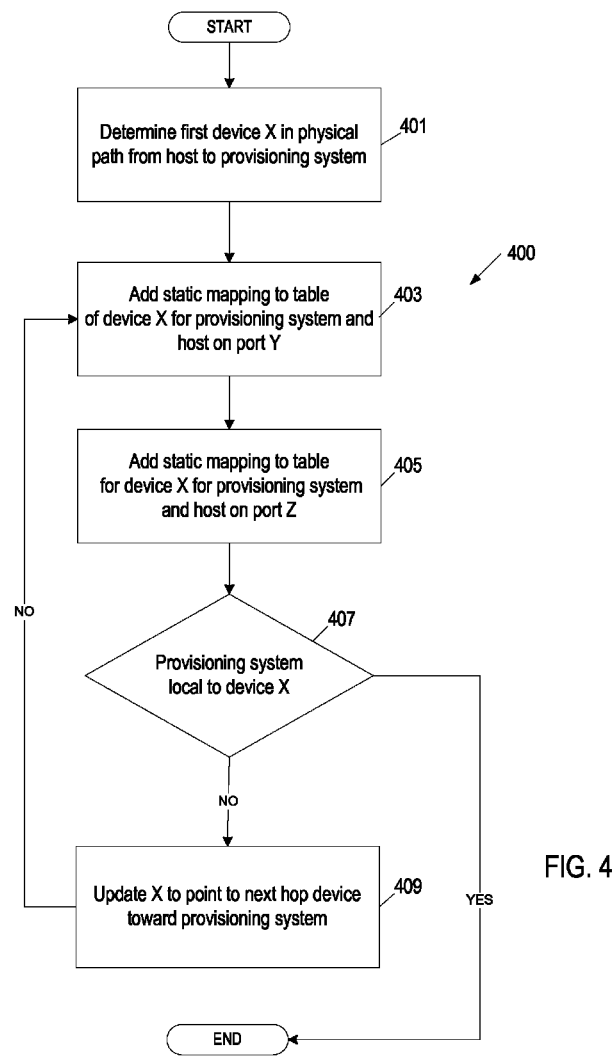
FIG. 4 is a flow diagram illustrating an embodiment of a method of determining a physical path.

FIG. 4 is a flow diagram of an embodiment of a method 400 for determining a physical path for a signal in a network between a provisioning system and a host. The method 400 is performed by processing logic that may comprise hardware (circuitry, dedicated logic, etc.), software (such as is run on a general purpose computer system or a dedicated machine), or a combination of both. In one embodiment, the method 400 is performed by the provisioning system 220 of FIG. 2.

At block 401, the path module 205 of the provisioning system 220 determines the first device (e.g., device X) in the physical path from the host 210 to the provisioning system 220, e.g., via SNMP. In one embodiment, device (e.g., switch) topology is implicitly known by the provisioning system 220. In other words, an L2 network may be maintained by a single organization such that the topology of the network is known (e.g., a documented listing containing all of the ports on all of the switches in the network and the devices connected to those ports). Further, the management IP addresses of the devices are also known so that configuration and management of the devices can be performed on the devices from a central location. In the example shown in FIG. 2, the provisioning system 220 determines that the first device in the physical path from the host 210 to the provisioning system 220 is device 250C.

At block 403, the provisioning host 220 adds static mapping (e.g., MAC addresses) to the table (e.g., the ARP table) of device X for the provisioning system 220 and the host 210 on a port (e.g., port Y). In the example shown in FIG. 2, the provisioning host 220 adds static mapping to table 252C of device 250C for the provisioning system 220 and the host 210 for port 256C.

At block 405, the provisioning host 220 then adds static mapping (e.g., MAC addresses) to the table of device X for the provisioning system 220 and the host 210 on a port (e.g., port Z). In the example shown in FIG. 2, the provisioning host 220 adds static mapping to table 252C of device 250C for the provisioning system 220 and the host 210 for port 254C.

At block 407, the path module 205 provisioning host 220 then determines whether the provisioning system 220 is local to device X. In other words, the path module 205 determines whether there are any other devices between device X and the provisioning system 220. In the example shown in FIG. 2, the path module 205 determines whether there are any devices between device 250C and the provisioning system 220. In this example, device 250C is not local to the provisioning system 220 because there are devices between device 250C and the provisioning system 220.

At block 409, if the provisioning system 220 is not local to device X, the X is updated to point to the next hop device towards the provisioning system 220. In other words, the path module 205 looks to the next closest device to the provisioning system 220. Then, blocks 403, 405, and 407 are repeated until the provisioning system is local to device X. In the example shown in FIG. 2, the next hop device towards the provisioning system 220 is device 250B. The provisioning system 220 will then update table 252B of device 250B to add static mapping for the provisioning system 220 and the host 210 for ports 256B and 254B, as similarly described above.

Further, the next hop device towards the provisioning system 220 after device 250B is device 250A. The provisioning system 220 will then update table 252A of device 250A to add static mapping for the provisioning system 220 and the host 210 for ports 256A and 254A, as similarly described above.

Once the tables 252A, 252B, and 252C for all of the devices 250A, 250B, and 250C between the host 210 and the provisioning system 220 have been updated to add static addresses for the host 210 and the provisioning system 220 to ports 254A and port 256A, port 254B and port 256B, and port 254C and port 256C, respectively, the physical path between the host 210 and the provisioning system 220 is fixed. In other words, communication between the provisioning system 220 and the host 210 will only be conducted via the particular physical path that includes port 254A, port 256A, port 254B, port 256B, port 254C, and port 256C. Therefore, if an attacker attempts to communicate with either the provisioning system 220 or the host 210 via another port, the provisioning system 220 and the host 210 will disregard the attacker's attempt to communicate. In other words, by creating a static ARP entry in a switch, traffic to and from the host with a particular MAC address may only occur over the associated port of the switch in the static entry. As such, traffic from a malicious host pretending to be a legitimate host (e.g., by reusing the legitimate host's MAC address) must arrive over a port that is not connected to the legitimate hosts port on the switch, and, therefore, the switch will drop the malicious traffic.

In one embodiment, only MAC addresses for the host are added to the tables of the devices. In another embodiment, only MAC addresses for the host are added to the tables of the devices for only the ingress ports. In yet another embodiment, MAC addresses for the host and the provisioning system are added to the tables of the devices for only the ingress ports.

Figure 5:
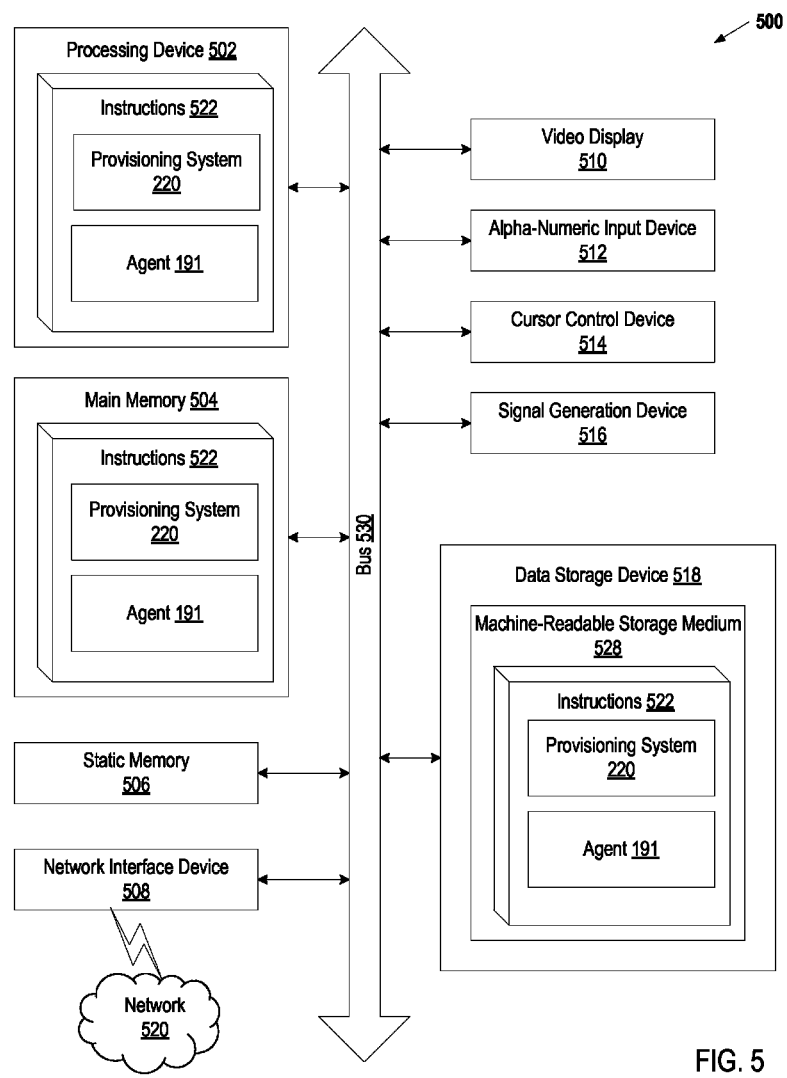
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (e.g., processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media. The instructions 522 may further be transmitted or received over a network 520 via the network interface device 508.

In one embodiment, the instructions 522 include instructions for a provisioning system (e.g., provisioning system 220 of FIG. 2), an agent 191 and/or a software library containing methods that call a launch server and/or agent. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:
1. A method comprising:
   determining, by a processing device of a provisioning system, a physical path connecting a host in a cloud and the provisioning system, wherein the physical path identifies a plurality of network devices along the physical path between the host and the provisioning system;

receiving, by the processing device of the provisioning system, a request to provision a virtual machine on the host;

adding, by the processing device, a network address for the host to a configuration of each of the network devices along the physical path prior to initiating a provisioning of the virtual machine on the host; and sending, by the processing device of the provisioning system, installation information for the virtual machine via the determined physical path.

2. The method of claim 1 further comprising receiving, by the provisioning system, confirmation of completion of provisioning of the host over the determined physical path.

3. The method of claim 2, wherein receiving confirmation of completion of provisioning of the host comprises receiving, by the provisioning system, confirmation of completion via an Internet Protocol (IP) address from the host.

4. The method of claim 1, wherein at least one of the network devices comprises a switch.

5. The method of claim 1, wherein determining a physical path comprises:
selecting the network devices between the provisioning system and the host; and
adding a static mapping comprising the network address to a table for at least one of the network devices.

6. The method of claim 5, wherein the static mapping is added via a Single Network Management Protocol (SNMP) request.

7. The method of claim 5, wherein the static mapping designates a port of a network device associated with the virtual machine.

8. The method of claim 1, wherein the provisioning system and at least one of the network devices are remote from the cloud.

9. A system comprising:
a memory; and
a processing device operatively coupled to the memory, the processing device to:
determine a physical path connecting a host in a cloud and a provisioning system, wherein the physical path identifies a plurality of network devices along the physical path between the host and the provisioning system;
receive a request to provision a virtual machine on the host;
add a network address for the host to a configuration of each of the network devices along the physical path prior to initiating a provisioning of the virtual machine on the host; and
send installation information for the virtual machine via the determined physical path.

10. The system of claim 9, wherein the processing device is further to receive confirmation of completion of provisioning of the host over the determined physical path.

11. The system of claim 10, wherein to receive confirmation of completion of provisioning of the host, the processing device is to receive confirmation of completion via an Internet Protocol (IP) address from the host.

12. The system of claim 9, wherein at least one of the network devices comprises a switch.

13. The system of claim 9, wherein to determine a physical path comprises the processing device to:
select the network devices between the provisioning system and the host; and
add a static mapping comprising the network address to a table for at least one of the network devices.

14. The system of claim 13, wherein the static mapping is added via a Single Network Management Protocol (SNMP) request.

15. The system of claim 13, wherein the static mapping designates a port of a network device associated with the virtual machine.

16. A non-transitory computer-readable storage medium comprising instructions that, when executed by a processing device, cause the processing device to:
determine, by the processing device, a physical path connecting a host in a cloud and a provisioning system, wherein the physical path identifies a plurality of network devices along the physical path between the host and the provisioning system;
receive, by the processing device, a request to provision a virtual machine on the host;
add, by the processing device, a network address for the host to a configuration of the network devices along the physical path prior to initiating a provisioning of the virtual machine on the host; and
send, by the processing device, installation information for the virtual machine via the determined physical path.

17. The non-transitory computer-readable storage medium of claim 16, wherein the processing device is to receive confirmation of completion of provisioning of the host via an Internet Protocol (IP) address from the host.

18. The non-transitory computer-readable storage medium of claim 16, wherein to determine a physical path comprises the processing device to:
select the network devices between the provisioning system and the host; and
add a static mapping to a table for at least one of the network devices.

19. The non-transitory computer-readable storage medium of claim 18, wherein the static mapping is added via a Single Network Management Protocol (SNMP) request.

20. The non-transitory computer-readable storage medium of claim 18, wherein the static mapping designates a port of a network device associated with the virtual machine.

* * * * *